(12) United States Patent
Chen et al.

(10) Patent No.: US 11,385,359 B2
(45) Date of Patent: Jul. 12, 2022

(54) POINT CLOUD DATA ACQUISITION METHOD AND DEVICE UNDER SITUATION OF NO GNSS SIGNAL

(71) Applicants: CHONGQING SURVEY INSTITUTE, Chongqing (CN); CHONGQING CYBERCITY SCI-TECH CO., LTD., Chongqing (CN)

(72) Inventors: Hanxin Chen, Chongqing (CN); Zejun Xiang, Chongqing (CN); Chuan Long, Chongqing (CN); Jing Ming, Chongqing (CN); Yonggang Gou, Chongqing (CN); Nan Lv, Chongqing (CN); Han Chen, Chongqing (CN); Zaiqian Luo, Chongqing (CN); Feng Li, Chongqing (CN); Zhi Huang, Chongqing (CN); Xiaolin Hu, Chongqing (CN)

(73) Assignees: CHONGQING SURVEY INSTITUTE, Chongqing (CN); CHONGQING CYBERCITY SCI-TECH CO., LTD., Chongqing (CN)

( * ) Notice: Subject to any disclaimer, the term of this patent is extended or adjusted under 35 U.S.C. 154(b) by 264 days.

(21) Appl. No.: 16/300,963

(22) PCT Filed: Dec. 25, 2017

(86) PCT No.: PCT/CN2017/118367
§ 371 (c)(1),
(2) Date: Nov. 13, 2018

(87) PCT Pub. No.: WO2019/071840
PCT Pub. Date: Apr. 18, 2019

(65) Prior Publication Data
US 2021/0223408 A1 Jul. 22, 2021

(30) Foreign Application Priority Data

Oct. 13, 2017 (CN) .......................... 201710954082.7

(51) Int. Cl.
*G01S 19/48* (2010.01)
*G01S 17/86* (2020.01)
(Continued)

(52) U.S. Cl.
CPC .......... *G01S 19/485* (2020.05); *G01C 21/165* (2013.01); *G01S 7/4808* (2013.01);
(Continued)

(58) Field of Classification Search
CPC ........ G01S 19/485; G01S 17/42; G01S 17/86; G01S 19/49; G01S 17/89; G01S 7/4808; G01C 21/165
See application file for complete search history.

(56) References Cited

U.S. PATENT DOCUMENTS 10,983,201 B2 * 4/2021 Pimentel ................ B64C 39/024
11,151,394 B2 * 10/2021 Schroeter ............. G08G 1/0112
(Continued)

FOREIGN PATENT DOCUMENTS

| CN | 102338616 A | 2/2012 |
| CN | 105203023 A | 12/2015 |
| CN | 105628026 A | 6/2016 |

*Primary Examiner* — Thomas M Hammond, III
(74) *Attorney, Agent, or Firm* — Global IP Service; Tianhua Gu (57) ABSTRACT

The present invention provides a point cloud data acquisition method and device under a situation of no GNSS signal. The method comprises: re-sampling line data acquired from a topographic map to obtain discrete line data; generating a full-second PPS pulse in a simulating manner; counting by using a distance measuring instrument, sampling the count, when it is detected that the full-second PPS pulse is received, calculating position information at a current (Continued)

moment; simulating a GNSS satellite protocol according to the position information at the current moment; parsing the GNSS satellite protocol by using a point cloud data acquisition module to complete time synchronization, and controlling a LiDAR to acquire point cloud data; parsing the GNSS satellite protocol by using an inertial measurement module, and recording attitude determination positioning data in real time to generate POS data; and optimizing the POS data to obtain accurate point cloud data.

6 Claims, 4 Drawing Sheets

(51) Int. Cl.
| | | |
|---|---|---|
| *G01S 17/42* | (2006.01) | |
| *G01S 19/49* | (2010.01) | |
| *G01C 21/16* | (2006.01) | |
| *G01S 7/48* | (2006.01) | |
| *G01S 17/89* | (2020.01) | |

(52) U.S. Cl.
CPC .............. *G01S 17/42* (2013.01); *G01S 17/86* (2020.01); *G01S 17/89* (2013.01); *G01S 19/49* (2013.01)

(56) References Cited

U.S. PATENT DOCUMENTS

| | | | |
|---|---|---|---|
| 11,226,412 B2* | 1/2022 | Thompson | .............. G01S 15/89 |
| 2014/0247183 A1 | 9/2014 | Lawrence et al. | |

* cited by examiner

POINT CLOUD DATA ACQUISITION METHOD AND DEVICE UNDER SITUATION OF NO GNSS SIGNAL

CROSS REFERENCE TO RELATED PATENT APPLICATION

The present application is the US national stage of PCT/CN2017/118367 filed on Dec. 25, 2017, which claims the priority of the Chinese patent application No. 2017109540827 filed on Oct. 13, 2017, which application is incorporated herein by reference.

FIELD OF INVENTION

The present invention relates to the technical field of data acquisition, in particular to a point cloud data acquisition method and device under a situation of no GNSS signal.

DESCRIPTION OF RELATED ARTS

As a newly emerging three-dimensional data acquisition technique, mobile measurement technique integrates sensors such as Global Navigation Satellite System (GNSS), Inertial Measurement Unit (IMU), Light Detection and Ranging (LiDAR) and Distance Measuring Instrument (DMI), which are mounted on different platforms such as vehicles, ships or airplanes and can rapidly acquire three-dimensional point cloud data. Due to the influence of satellite signal and precision, for a long time, the application of mobile measurement technique is limited to the open area where the satellite signal is better, and the data accuracy is poor under the situation of no GNSS signal. To break through the limitation of satellite signal, the application of mobile measurement technique to data acquisition in the poor satellite signal environment (such as urban subway and tunnel) can greatly improve the efficiency and accuracy of data acquisition.

Taking the point cloud data acquisition of urban subway under the situation of no GNSS signal as an example, the single point measurement method or the Synchronous Location And Mapping (SLAM) technique are usually used to perform point cloud data acquisition. The method of single point measurement is to use a 3D laser scanner to perform planar fixed-point scanning to the subway tunnel, and then a point cloud splicing algorithm is adopted to perform station splicing, calibration, adjustment and the like to obtain continuous point cloud data; and the SLAM technique uses the laser scanner in the process of moving to obtain point cloud, and simultaneously completes the calculation and matching of the relative position of the point cloud data during movement so that continuous point cloud data can be obtained.

However, a large number of stations need to be set up in the subway tunnel when single point measurement is adopted, in order to facilitate the point cloud data splicing between stations, the distance between stations can not exceed the effective scanning distance of the three-dimensional laser scanner. Because of the single shape of the subway tunnel, the accuracy of point cloud splicing can not be guaranteed. The accuracy of point cloud real-time matching based on the SLAM technique depends on the homonymous feature points between the matched point clouds. Compared with the subway tunnel with a single feature, the homonymous feature is not obvious. In order to improve the matching accuracy, a large number of artificial feature points need to be placed in the tunnel to achieve accurate matching between the point cloud data. In addition, the moving speed should not be too fast and the acquisition distance should not be too long during acquisition, so as to ensure the acquisition of high precision point cloud data. It is difficult to acquire point cloud data for long-distance subway tunnels using this technique.

Therefore, how to efficiently acquire the long-distance point cloud data without reducing the accuracy of the acquired point cloud data is a problem to be solved by one skilled in the art at present.

SUMMARY OF THE PRESENT INVENTION

In view of the disadvantages of the prior art, the purpose of the present invention is to provide a point cloud data acquisition method and device under a situation of no GNSS signal, which are used for solving the problem of how to acquire point cloud data efficiently on a premise that accuracy is guaranteed under the situation of no satellite signal in the prior art.

In order to realize the above-mentioned purpose and other related purposes, the present invention provides a point cloud data acquisition method under a situation of no GNSS signal, comprising:

re-sampling line data acquired from a topographic map to obtain discrete line data;

generating a full-second PPS pulse in a simulating manner by using a PPS generator;

counting by using a distance measuring instrument, sampling the count, when it is detected that the full-second PPS pulse from the PPS generator is received, calculating a sum of the counts of the distance measuring instrument in the full second, and calculating position information at a current moment according to parameters of the distance measuring instrument, position information at a previous moment and the line data;

simulating a GNSS satellite protocol according to the position information at the current moment and sending it to a point cloud data acquisition module and an inertial measurement module;

parsing the GNSS satellite protocol by using the point cloud data acquisition module to complete time synchronization, and controlling a LiDAR to acquire point cloud data;

parsing the GNSS satellite protocol by using the inertial measurement module, and recording attitude and position determination data in real time to generate POS data containing position information and attitude information; and sequentially optimizing the POS data by using the distance measuring instrument data and external control points to obtain corresponding point cloud data.

Another purpose of the presents invention is to provide a point cloud data acquisition device under a situation of no GNSS signal, comprising:

a memory used for storing a program; and a processor used for executing the program, the program further comprising:

a discrete module configured to re-sample line data acquired from a topographic map to obtain discrete line data;

a PPS module configured to generate a full-second PPS pulse in a simulating manner;

a DMI processing module configured to count by using a distance measuring instrument, sample the count, when it is detected that the full-second PPS pulse from the PPS generator is received, calculate a sum of the counts of the distance measuring instrument in the full second, and calculate position information at a current moment according to parameters of the distance measuring instrument, position information at a previous moment and the line data;

a GNSS simulation module configured to simulate a GNSS satellite protocol according to the position information at the current moment and send it to a point cloud data acquisition module and an inertial measurement module;

the point cloud data acquisition module configured to parse the GNSS satellite protocol to complete time synchronization, and control a LiDAR to acquire point cloud data;

the inertial measurement module configured to parse the GNSS satellite protocol, and record attitude and position determination data in real time to generate POS data containing position information and attitude information; and a POS data optimization module configured to sequentially optimize the POS data by using the distance measuring instrument data and external control points to obtain corresponding point cloud data.

As described above, the point cloud data acquisition method and device under the situation of no GNSS signal provided by the present invention have the following beneficial effects:

Under the situation of no GNSS signal or weak GNSS signal, the present invention re-samples the line data acquired from the topographic map to obtain discrete data, calculates the position information at the current moment according to the parameters of the distance measuring instrument, the position information at the previous time and the line data, and simulates the GNSS satellite protocol according to the position information of the current moment, acquires point cloud data based on this protocol by using the point cloud data acquisition module and inertial measurement module, and optimizes and outputs the point cloud data. Compared with the traditional method, the point cloud data acquisition method has higher efficiency and accuracy; and compared with the SLAM technique, the point cloud data acquisition method has better convenience.

DETAILED DESCRIPTION OF THE PREFERRED EMBODIMENTS

The implementation modes of the present invention will be described below through specific examples and one skilled in the art may easily understand other advantages and effects of the present invention according to the content disclosed in the description. The present invention may also be implemented or applied in other different specific implementation modes, and various modifications or variations may also be made to all details in the description based on different points of view and applications without departing from the spirit of the present invention. It needs to be stated that the embodiments below and the features in the embodiments may be mutually combined under a situation of no conflict.

It needs to be stated that the drawings provided in the embodiments below are only used for schematically illustrating the basic concept of the present invention, thus only illustrate components related to the present invention and are not drawn according to the number, shape and size of components during actual implementation, the configuration, number and scale of each component may be freely changed during actual implementation, and the layout configuration of the component may also be more complex.

Figure 1:
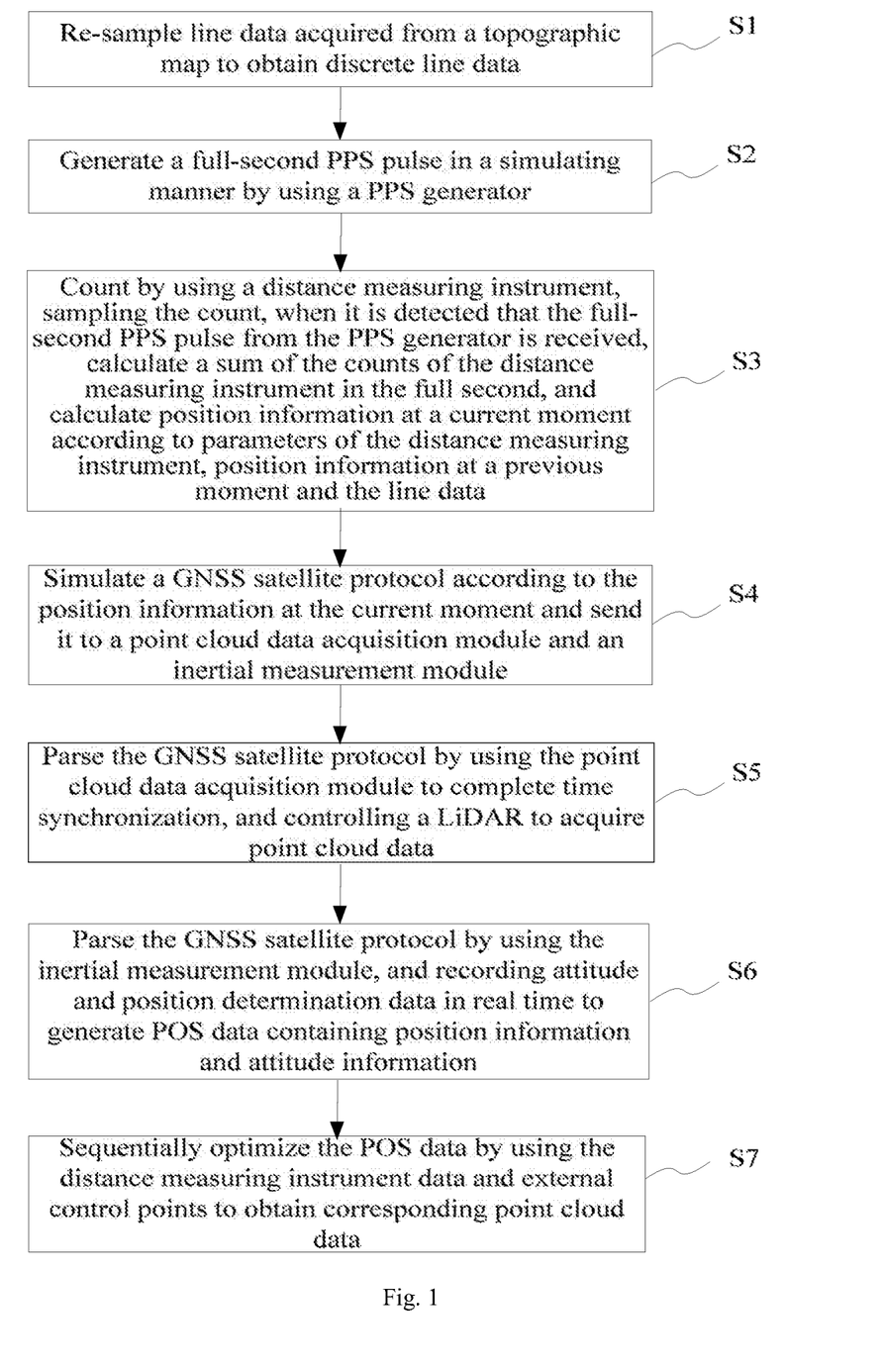
FIG. 1 illustrates a flowchart of a point cloud data acquisition method under a situation of no GNSS signal provided by the present invention.

Please refer to FIG. 1, which illustrates a flowchart of a point cloud data acquisition method under a situation of no GNSS signal provided by the present invention. The method comprises the following steps:

In step S1, line data acquired from a topographic map are re-sampled to obtain discrete line data.

Specifically, line data are acquired from a topographic map at a preset scale according to an accuracy requirement, and discrete line data are acquired by re-sampling the line data according to a preset distance interval. For example, for point cloud data acquisition of subway tunnels with an accuracy requirement of 5 cm, line data may be extracted from a topographic map at a scale of 1:500, and the line data may be re-sampled according to a certain interval (e.g. 0.1 m, 0.2 m, 0.4 m, 0.5 m or 1 m). The re-sampled discrete points contain the location information of longitude L, latitude B and height H, such as a coordinate point represented as (L, B, H), so as to obtain discrete line data. The smaller the sampling interval is, the higher the accuracy of the acquired sampling line data is.

In step S2, a full-second PPS pulse is generated in a simulating manner by using a PPS generator.

Specifically, the PPS generator is preferably a single chip microcomputer used to simulate a PPS signal. In order to eliminate the influence of crystal oscillation error of the single chip microcomputer on the PPS signal, the time interval of full second is statistically collected after confirming the operation stability of the single chip microcomputer, and the time interval is used as a full-second interval to simulate the PPS signal, so as to ensure the stability of the generated full-second PPS pulse signal.

In step S3, counting is performed by using a distance measuring instrument, the count is sampled, when it is detected that the full-second PPS pulse from the PPS generator is received, a sum of the counts of the distance measuring instrument in the full second is calculated, and position information at a current moment is calculated according to parameters of the distance measuring instrument, position information at a previous moment, and the line data.

Specifically, the distance measuring instrument is preferably a non-contact DMI distance measuring instrument herein, the distance counted by such distance measuring instrument is more accurate. The distance measuring instrument is simultaneously used at the beginning of the data acquisition operation, and the count of the distance measuring instrument is sampled.

In step S4, a GNSS satellite protocol is simulated according to the position information at the current moment, and then is sent to a point cloud data acquisition module and an inertial measurement module.

Specifically, when receiving the full-second PPS pulse, a GNSS satellite protocol is simulated according to time information and position information $P_1$ ($L_1$, $B_1$, $H_1$) at the current moment, and the simulated GNSS satellite protocol is respectively sent to a point cloud data acquisition module and an inertial measurement module.

In step S5, the GNSS satellite protocol is parsed by using the point cloud data acquisition module to complete time synchronization, and a LiDAR is controlled to acquire point cloud data.

Specifically, the point cloud data acquisition module parses the GNSS satellite protocol to complete the time synchronization, and uses the same clock source synchronization system to ensure the complete synchronization in time in the data acquisition process (taking the time of the LiDAR acquisition program as the synchronization reference time), and this ensures the synchronization of the point cloud data and POS data in data acquisition time, i.e., the output of the full-second pulse PPS provides accurate time information for the inertial measurement module.

In step S6, the GNSS satellite protocol is parsed by using the inertial measurement module, and attitude and positioning determination data are recorded in real time to generate POS data containing position information and attitude information.

Specifically, because of the use of high-accuracy inertial measurement module (IMU), the corresponding angular velocity and acceleration of the vehicle in the three-dimensional space in the process of traveling can be measured, and then calculate the corresponding position information and attitude information, namely, the POS data, and by using the inertial measurement module, many kinds of positioning and earth gravity field parameters can be quickly and independently measured without relying on other auxiliary equipment, the efficiency of operation is greatly improved and the limitation of natural conditions in traditional mobile measurement is also overcome.

In step S7, the POS data are sequentially optimized by using the distance measuring instrument data and external control points to obtain corresponding point cloud data.

Herein, external control points specifically include all known and significant control points within the effective range around the acquisition line. In addition, due to the influence of line data accuracy, distance measuring instrument counting accuracy, inertial measurement unit accuracy and the like, POS data may have some errors, and in order to get clouds data with more accurate and more reliable point, further optimization is needed.

In this embodiment, a large number of stations need to be arranged in comparison with the single-point measurement method, and the distance between stations cannot exceed the effective scanning distance of a three-dimensional laser scanner to ensure the accuracy of the point cloud data after splicing; compared with the SLAM technique, a large number of artificial feature points need to be arranged to achieve the accurate matching of point cloud data, and the acquisition speed and acquisition distance are limited; this method does not need splicing, or a large number of stations. By optimizing the acquired POS data, high-accuracy point cloud data can be obtained, and both measuring efficiency and measuring accuracy have been strongly guaranteed.

Figure 2:
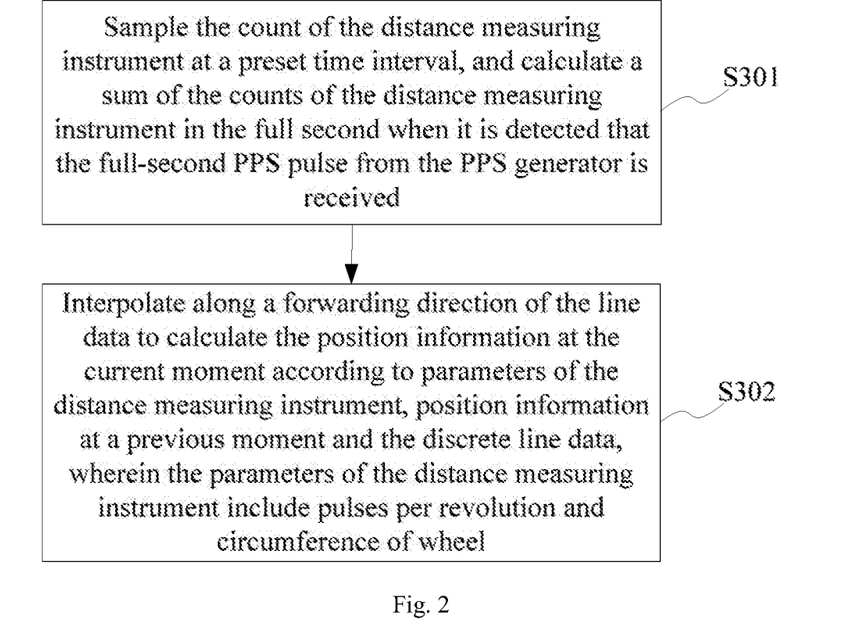
FIG. 2 illustrates a detailed flowchart of step S3 in a point cloud data acquisition method under a situation of no GNSS signal provided by the present invention.

Please refer to FIG. 2, which illustrates a detailed flowchart of step S3 in a point cloud data acquisition method under a situation of no GNSS signal provided by the present invention. Step S3 comprises the following steps:

Step S301, the count of the distance measuring instrument is sampled at a preset time interval, and a sum of the counts of the distance measuring instrument in the full second is calculated when detecting that the full-second PPS pulse from the PPS generator is received.

Specifically, the count of the distance measuring instrument is sampled at this time interval, the preset time interval may be set according to the user demand and is generally set to be 50 ms, and a sum of the counts of the distance measuring instruments in the full second is statistically collected when the full-second PPS pulse signal reaches.

Step S302, interpolation is performed along a forwarding direction of the line data to calculate the position information at the current moment according to parameters of the distance measuring instrument, position information at a previous moment and the discrete line data, wherein the parameters of the distance measuring instrument include pulses per revolution and circumference of wheel.

In this embodiment, if the time interval 50 ms is used to sample the count of the distance measuring instrument, when the full-second PPS pulse is received, calculating the sum of the counts of the distance measuring instrument in the full second is, and calculating the position information $P_1$ ($L_1$, $B_1$, $H_1$) of the acquisition device at the current moment by adopting a linear interpolation method in the sampling line along the forwarding direction of the acquisition device according to the pulses per revolution of the distance measuring instrument (for example, 360PPR), the circumference L of wheel, the position information $P_0$ ($L_0$, $B_0$, $H_0$) of the previous moment and the sampling line data.

Herein, the interpolation method includes Lagrange interpolation, Newton interpolation, piecewise linear interpolation and spline interpolation. Herein piecewise linear interpolation is preferred.

Figure 3:
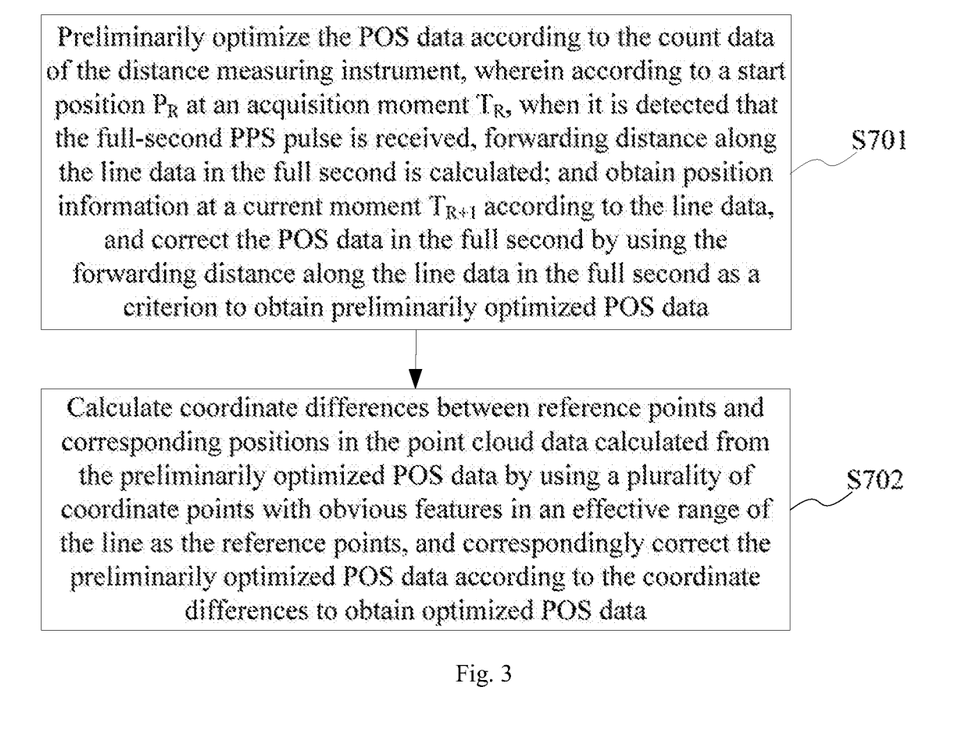
FIG. 3 illustrates a detailed flowchart of step S7 in a point cloud data acquisition method under a situation of no GNSS signal provided by the present invention.

Please refer to FIG. 3, which illustrates a detailed flowchart of step S7 in a point cloud data acquisition method under a situation of no GNSS signal provided by the present invention. Step S7 comprises the following steps:

Step S701, the POS data are preliminarily optimized according to the count data of the distance measuring instrument, wherein according to a start position $P_R$ ($L_R$, $B_R$, $H_R$) at an acquisition moment $T_R$, when it is detected that the full-second PPS pulse is received, forwarding distance $$D = \frac{N}{P} gL$$

along the line data in the full second is calculated according to the sum N of the counts of the distance measuring instrument in the full second, the pulses per revolution P and the circumference L of wheel; position information $P_{R+1}$ ($L_{R+1}$, $B_{R+1}$, $H_{R+1}$) at a current moment $T_{R+1}$ is obtained according to the sampling line data, and the POS data in the full second are corrected by using the forwarding distance along the line data in the full second as a criterion to obtain preliminarily optimized POS data.

Specifically, difference correction is performed to position information $P_{R+1}$ ($L_{R+1}$, $B_{R+1}$, $H_{R+1}$) at a current moment $T_{R+1}$ according to the calculated forwarding distance to obtain preliminarily optimized POS data.

Step S702, coordinate differences between reference points and corresponding positions in the point cloud data calculated from the preliminarily optimized POS data is calculated by using a plurality of coordinate points with obvious features in an effective range of the line as the reference points, and the preliminarily optimized POS data are correspondingly corrected according to the coordinate differences to obtain optimized POS data.

Specifically, the coordinate points with obvious features are preferably surface feature points having obvious features within the effective range around the acquisition line, or control points artificially arranged. With the above-mentioned surface feature points or control points being selected as the reference points, the coordinate differences between the reference points and the corresponding positions in the point cloud data calculated from the preliminarily optimized POS data are calculated. For example, the reference points along the direction of the acquisition line are sequentially A, B and C, each of which is a known coordinate point, the coordinate points A1, B1 and C1 corresponding to the reference points are selected from the point cloud data calculated by the preliminarily optimized POS data, the coordinate differences between the reference points A, B, C and the corresponding coordinate points A1, B1 and C1 are calculated, difference correction is sequentially performed to the corresponding POS data according to the coordinate differences, and the entire POS data are optimized again to ensure the accuracy of POS data.

In this embodiment, two optimizations are performed, wherein during the first optimization, the POS data acquired randomly are optimized according to full-second PPS and the accuracy of the entire POS data is greatly improved; during the second optimization, taking the known coordinate points with obvious features as the reference points, the reference points are compared with coordinate points corresponding to point cloud data generated from the POS data first optimized, the acquired point cloud data are accurately optimized, the accuracy of the acquired point cloud data is ensured by the two optimizations.

Figure 4:
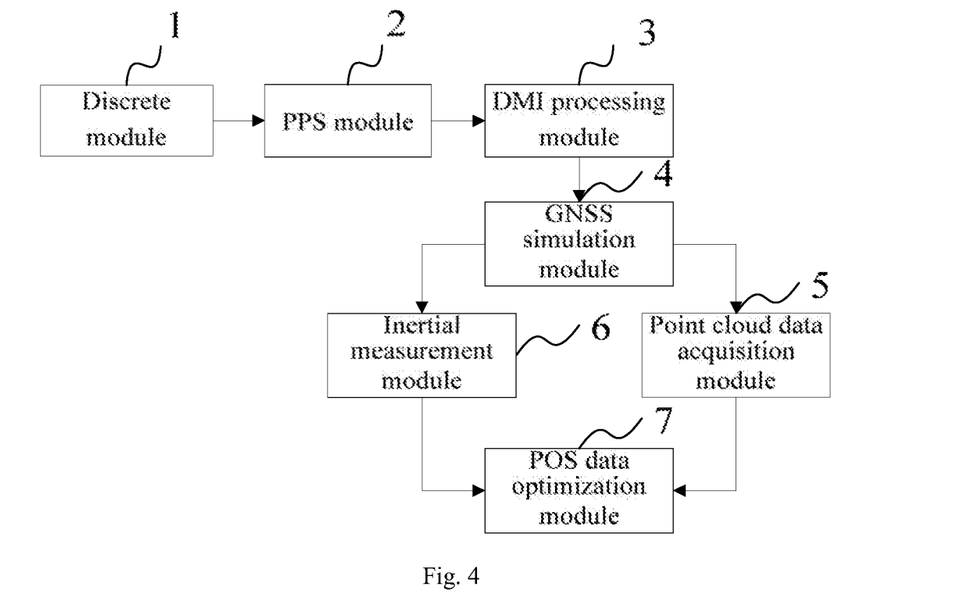
FIG. 4 illustrates a structural diagram of a point cloud data acquisition device under a situation of no GNSS signal provided by the present invention.

Please refer to FIG. 4, which illustrates a point cloud data acquisition device under a situation of no GNSS signal provided by the present invention. The device comprises:

a memory used for storing a program; and a processor used for executing the program, wherein the program further comprises:

a discrete module 1, configured to re-sample line data acquired from a topographic map are re-sampled to obtain discrete line data, wherein, specifically, line data are acquired from a topographic map at a preset scale according to an accuracy requirement, and discrete line data are acquired by re-sampling the line data according to a preset distance interval; and the re-sampled discrete points contain include the location information of longitude, latitude and height, such that higher-accuracy line data can be obtained.

A PPS generator 2 configured to generate a full-second PPS pulse in a simulating manner, wherein, specifically, PPS (Pulse Per Second), as compared with direct UTC time, has a delay when a user receives it. In order to accurately tell the time, PPS signal rising edge is introduced to mark the full-second moment of UTC, the accuracy can be nanosecond level, and the time accuracy is improved due to no cumulative error.

A DMI processing module 3 configured to count by using a distance measuring instrument, sample the count. When detecting that the full-second PPS pulse from the PPS generator is received, calculate a sum of the counts of the distance measuring instrument in the full second, and calculate position information at a current moment according to parameters of the distance measuring instrument, position information at a previous moment and the line data.

Figure 5:
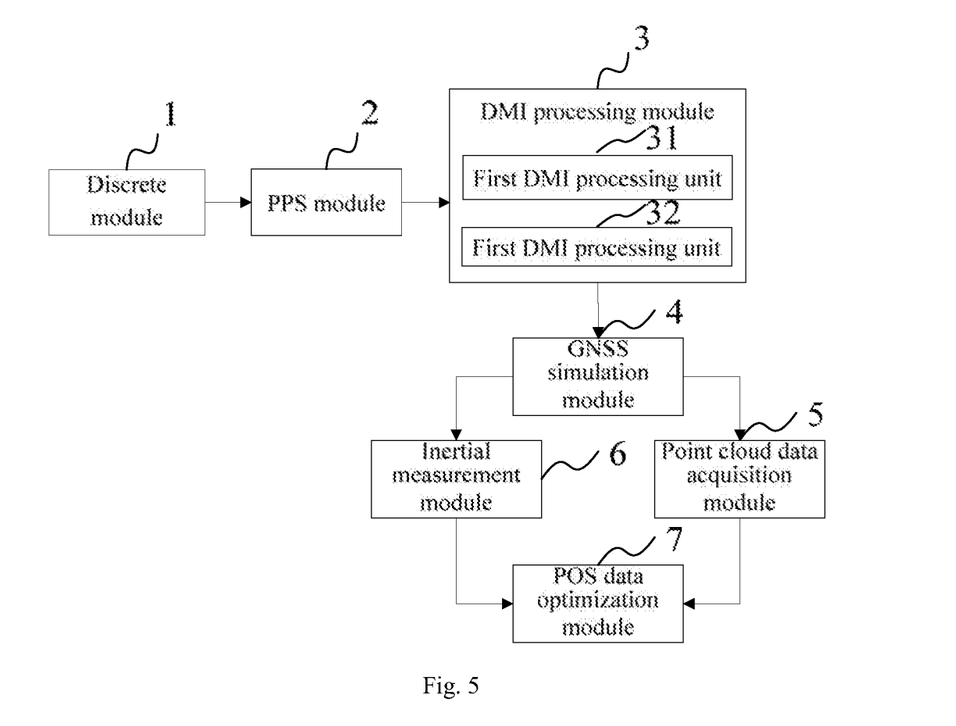
FIG. 5 illustrates a structural diagram of a DMI processing module in a point cloud data acquisition device under a situation of no GNSS signal provided by the present invention.

Please refer to FIG. 5, which illustrates a structural diagram of a DMI processing module in a point cloud data acquisition device under a situation of no GNSS signal provided by the present invention. The DMI processing module comprises:

a first DMI processing unit 31 configured to sample the count of the distance measuring instrument at a preset time interval, and calculate a sum of the counts of the distance measuring instrument in the full second when it is detected that the full-second PPS pulse from the PPS generator is received; a second DMI processing unit 32 configured to interpolate along a forwarding direction of the line data to calculate the position information at the current moment according to parameters of the distance measuring instrument, position information at a previous moment and the discrete line data, wherein the parameters of the distance measuring instrument include pulses per revolution and circumference of wheel.

A GNSS simulation module 4 configured to simulate a GNSS satellite protocol according to the position information at the current moment and send it to a point cloud data acquisition module and an inertial measurement module, wherein, specifically, when receiving the full-second PPS pulse, a GNSS satellite protocol is simulated according to time information and position information at the current moment, and the simulated GNSS satellite protocol is respectively sent to a point cloud data acquisition module and an inertial measurement module.

The point cloud data acquisition module 5 configured to parse the GNSS satellite protocol to complete time synchronization, and control a LiDAR to acquire point cloud data.

the inertial measurement module 6 configured to parse the GNSS satellite protocol, and record attitude and position determination data in real time to generate POS data containing position information and attitude information.

A POS data optimization module 7 configured to sequentially optimize the POS data by using the distance measuring instrument data and external control points to obtain corresponding point cloud data.

Figure 6:
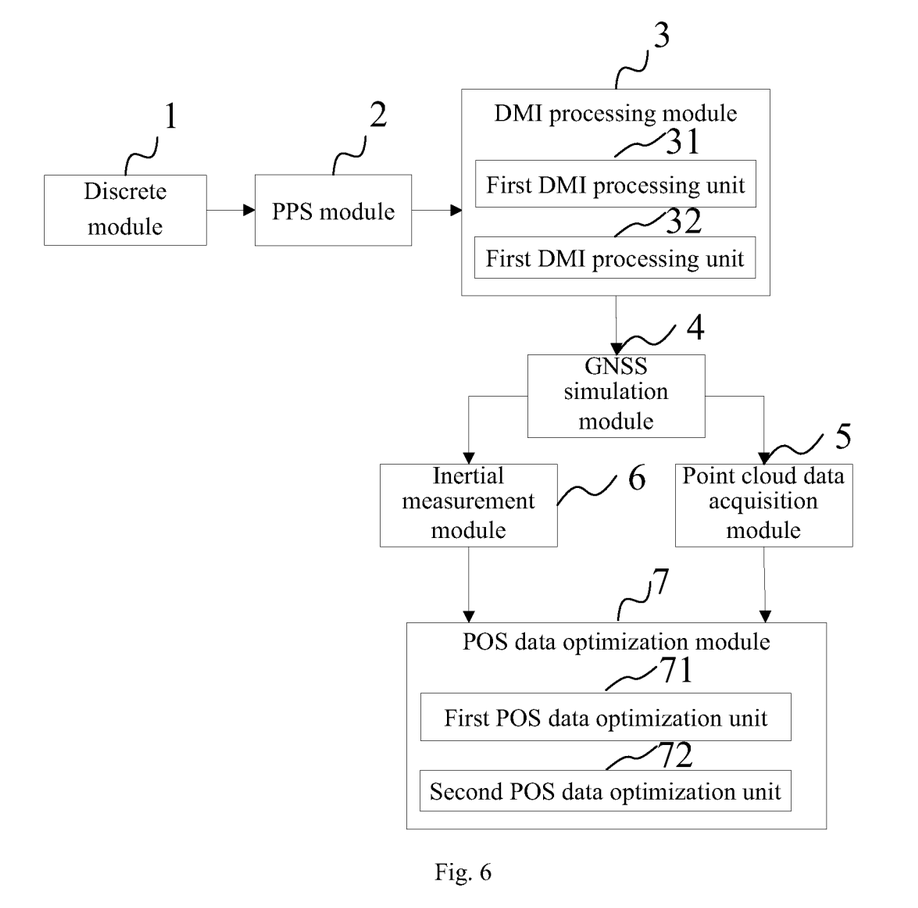
FIG. 6 illustrates a structural diagram of a POS data optimization module in a point cloud data acquisition device under a situation of no GNSS signal provided by the present invention.

Please refer to FIG. 6, which illustrates a structural diagram of a POS data optimization module in a point cloud data acquisition device under a situation of no GNSS signal provided by the present invention, and the POS data optimization module comprises:

a first POS data optimization unit 71 configured to preliminarily optimize the POS data according to the count data of the distance measuring instrument. Wherein according to a start position $P_R$ ($L_R$, $B_R$, $H_R$) at an acquisition moment $T_R$, when it is detected that the full-second PPS pulse is received, calculate forwarding distance $$D = \frac{N}{P}gL$$

along the line data in the full second according to the sum N of the counts of the distance measuring instrument in the full second, the pulses per revolution P and the circumference L of wheel; obtain position information $P_{R+1}$ ($L_{R\_1}$, $B_{R\_1}$, $H_{R\_1}$) at a current moment $T_{R+1}$ according to the line data, and correct the POS data in the full second by using the forwarding distance along the line data in the full second as a criterion to obtain preliminarily optimized POS data; and a second POS data optimization unit 72 configured to calculate coordinate differences between reference points and corresponding positions in the point cloud data calculated from the preliminarily optimized POS data by using a plurality of coordinate points with obvious features in an effective range of the line as the reference points, and correspondingly correct the preliminarily optimized POS data according to the coordinate differences to obtain optimized POS data.

To sum up, under the situation of no GNSS signal or weak GNSS signal, the present invention re-samples the line data acquired from the topographic map to obtain discrete data, calculates the position information at the current moment according to the parameters of the distance measuring instrument, the position information at the previous time and the line data, and simulates the GNSS satellite protocol according to the position information of the current moment, acquires point cloud data based on this protocol by using the point cloud data acquisition module and inertial measurement module, and optimizes and outputs the point cloud data. Compared with the traditional method, the point cloud data has acquisition efficiency and accuracy; and compared with the SLAM technique, the point cloud data acquisition method has better convenience. Therefore, the present invention effectively overcomes various disadvantages in the prior art and thus has a great industrial utilization value.

The above-mentioned embodiments are used for only exemplarily describing the principle and effects of the present invention instead of limiting the present invention. One skilled in the art may make modifications or variations to the above-mentioned embodiments without departing from the spirit and scope of the present invention. Therefore, all equivalent modifications or variations made by those who have common general knowledge in the art without departing from the spirit and technical thought disclosed by the present invention shall still be covered by the claims of the present invention.

What is claimed is:

1. A point cloud data acquisition method under a situation of no GNSS signal, comprising:
   re-sampling line data acquired from a topographic map to obtain discrete line data;
   generating a full-second PPS pulse in a simulating manner by using a PPS generator;
   counting by using a distance measuring instrument, sampling the count, when it is detected that the full-second PPS pulse from the PPS generator is received, calculating a sum of the counts of the distance measuring instrument in the full second, and calculating position information at a current moment according to parameters of the distance measuring instrument, position information at a previous moment and the line data;
   simulating a GNSS satellite protocol according to the position information at the current moment and sending it to a point cloud data acquisition module and an inertial measurement module, wherein simulating the GNSS satellite protocol further comprises:
      when receiving the full-second PPS pulse, simulating a GNSS satellite protocol according to time information and position information at the current moment, and respectively sending the simulated GNSS satellite protocol to a point cloud data acquisition module and an inertial measurement module;
   parsing the GNSS satellite protocol by using the point cloud data acquisition module to complete time synchronization, and controlling a LiDAR to acquire point cloud data;
   parsing the GNSS satellite protocol by using the inertial measurement module, and recording attitude and position determination data in real time to generate POS data containing position information and attitude information; and
   sequentially optimizing the POS data by using the distance measuring instrument data and external control points to obtain corresponding point cloud data, wherein sequentially optimizing the POS data further comprises:
      preliminarily optimizing the POS data according to the count data of the distance measuring instrument, wherein according to a start position $P_R$ at an acquisition moment $T_R$, when it is detected that the full-second PPS pulse is received, calculate forwarding distance $D=(N/P)gL$ along the line data in the full second according to the sum N of the counts of the distance measuring instrument in the full second, the pulses per revolution P and the circumference L of wheel;
      obtaining position information $P_{R+1}$ at a current moment $T_{R+1}$ according to the line data, and correcting the POS data in the full second by using the forwarding distance along the line data in the full second as a criterion to obtain preliminarily optimized POS data; and
      calculating coordinate differences between reference points and corresponding positions in the point cloud data calculated from the preliminarily optimized POS data by using a plurality of coordinate points with obvious features in an effective range of the line as the reference points, and correspondingly correcting the preliminarily optimized POS data according to the coordinate differences to obtain optimized POS data.

2. The point cloud data acquisition method under the situation of no GNSS signal according to claim 1, characterized in that re-sampling line data acquired from a topographic map to obtain discrete line data comprises: acquiring line data from a topographic map at a preset scale according to an accuracy requirement, and acquiring discrete line data by re-sampling the line data according to a preset distance interval.

3. The point cloud data acquisition method under the situation of no GNSS signal according to claim 1, characterized in that counting by using a distance measuring instrument, sampling the count, when it is detected that the full-second PPS pulse from the PPS generator is received, calculating a sum of the counts of the distance measuring instrument in the full second, and calculating position information at a current moment according to parameters of the distance measuring instrument, position information at a previous moment and the line data comprises: sampling the count of the distance measuring instrument at a preset time interval, and calculating a sum of the counts of the distance measuring instrument in the full second when it is detected that the full-second PPS pulse from the PPS generator is received; and interpolating along a forwarding direction of the line data to calculate the position information at the current moment according to parameters of the distance measuring instrument, position information at a previous moment and the discrete line data, wherein the parameters of the distance measuring instrument include pulses per revolution and circumference of wheel.

4. A point cloud data acquisition device under a situation of no GNSS signal, comprising:
   a memory used for storing a program; and
   a processor used for executing the program, the program further comprising:

a discrete module configured to re-sample line data acquired from a topographic map to obtain discrete line data;

a PPS module configured to generate a full-second PPS pulse in a simulating manner;

a DMI processing module configured to count by using a distance measuring instrument, sample the count, when it is detected that the full-second PPS pulse from the PPS generator is received, calculate a sum of the counts of the distance measuring instrument in the full second, and calculate position information at a current moment according to parameters of the distance measuring instrument, position information at a previous moment and the line data;

a GNSS simulation module configured to simulate a GNSS satellite protocol according to the position information at the current moment and send it to a point cloud data acquisition module and an inertial measurement module, wherein the GNSS simulation module is further configured to:

when receiving the full-second PPS pulse, simulate a GNSS satellite protocol according to time information and position information at the current moment, and respectively send the simulated GNSS satellite protocol to a point cloud data acquisition module and an inertial measurement module;

the point cloud data acquisition module configured to parse the GNSS satellite protocol to complete time synchronization, and control a LiDAR to acquire point cloud data;

the inertial measurement module configured to parse the GNSS satellite protocol, and record attitude and position determination data in real time to generate POS data containing position information and attitude information; and a POS data optimization module configured to sequentially optimize the POS data by using the distance measuring instrument data and external control points to obtain corresponding point cloud data, wherein the POS data optimization comprises:

a first POS data optimization unit configured to preliminarily optimize the POS data according to the count data of the distance measuring instrument, wherein according to a start position $P_R$ at an acquisition moment $T_R$, when it is detected that the full-second PPS pulse is received, calculate forwarding distance $D=(N/P)gL$ along the line data in the full second according to the sum N of the counts of the distance measuring instrument in the full second, the pulses per revolution P and the circumference L of N heel, and obtain position information $P_{R+1}$ at a current moment $T_{R+1}$ according to the line data, and correct the POS data in the full second by using the forwarding distance along the line data in the full second as a criterion to obtain preliminarily optimized POS data; and a second POS data optimization unit configured to calculate coordinate differences between reference points and corresponding positions in the point cloud data calculated from the preliminarily optimized POS data by using a plurality of coordinate points with obvious features in an effective range of the line as the reference points, and correspondingly correct the preliminarily optimized POS data according to the coordinate differences to obtain optimized POS data.

5. The point cloud data acquisition device under the situation of no GNSS signal according to claim 4, characterized in that the discrete module is configured to acquire line data from a topographic map at a preset scale according to an accuracy requirement, and acquire discrete line data by re-sampling the line data according to a preset distance interval.

6. The point cloud data acquisition device under the situation of no GNSS signal according to claim 4, characterized in that the DMI processing module comprises: a first DMI processing unit configured to sample the count of the distance measuring instrument at a preset time interval, and calculate a sum of the counts of the distance measuring instrument in the full second when it is detected that the full-second PPS pulse from the PPS generator is received; and a second DMI processing unit configured to interpolate along a forwarding direction of the line data to calculate the position information at the current moment according to parameters of the distance measuring instrument, position information at a previous moment and the discrete line data, wherein the parameters of the distance measuring instrument include pulses per revolution and circumference of wheel.

* * * * *